(12) United States Patent
Alba et al.

(10) Patent No.: US 8,788,333 B2
(45) Date of Patent: Jul. 22, 2014

(54) METHOD, APPARATUS, AND COMPUTER PROGRAM PRODUCT FOR FACILITATING PROMOTIONS WITH AN E-WALLET

(75) Inventors: Jose A. Alba, Long Island City, NY (US); David Grossman, Brooklyn, NY (US)

(73) Assignee: Mastercard International Incorporated, Purchase, NY (US)

( * ) Notice: Subject to any disclaimer, the term of this patent is extended or adjusted under 35 U.S.C. 154(b) by 166 days.

(21) Appl. No.: 13/032,373

(22) Filed: Feb. 22, 2011

(65) Prior Publication Data

US 2011/0208656 A1 Aug. 25, 2011

Related U.S. Application Data

(60) Provisional application No. 61/307,131, filed on Feb. 23, 2010.

(51) Int. Cl.
*G06Q 30/00* (2012.01)
*G06F 21/00* (2013.01)

(52) U.S. Cl.
USPC .......................................... 705/14.29; 705/52

(58) Field of Classification Search
USPC ....................................... 235/458; 705/1.294
See application file for complete search history.

(56) References Cited

U.S. PATENT DOCUMENTS

| | | | |
|---|---|---|---|
| 4,825,045 A | 4/1989 | Humble | |
| 4,833,308 A | 5/1989 | Humble | |
| 5,173,851 A | 12/1992 | Off | |
| 5,537,314 A | 7/1996 | Kanter | |
| 5,612,868 A | 3/1997 | Off | |
| 5,621,812 A | 4/1997 | Deaton | |
| 5,644,723 A | 7/1997 | Deaton | |
| 5,649,114 A | 7/1997 | Deaton | |

(Continued)

OTHER PUBLICATIONS

Mjolsnes et al. "On-Line E-Wallet System with Decentralized Credential Keepers", Sep. 23, 2002.*

(Continued)

*Primary Examiner* — Evens J Augustin
(74) *Attorney, Agent, or Firm* — Otterstedt, Ellenbogen & Kammer, LLP

(57) ABSTRACT

An electronic wallet platform obtains, from a check-out web page of a merchant, (i) a unique identification of a given consumer, of a plurality of consumers, who is purchasing at least one item from the merchant in an on-line transaction, and (ii) associated transaction data. The electronic wallet platform supplies, to a transaction qualification service, the unique identification of the given consumer; and retrieves, from a consumer enrollment database, a record wherein at least one useful token is stored in association with the unique identification of the given consumer. The transaction qualification service determines, based on rules from an offers registry database, whether the at least one useful token is applicable to the on-line transaction. The rules are stored in the offers registry database in association with the at least one useful token, and the rules take into account at least one of the unique identification of the given consumer and the associated transaction data in determining the applicability. If, based on the determining step, the at least one useful token is applicable to the on-line transaction, a further step includes providing the at least one useful token to the merchant, using the transaction qualification service and the electronic wallet platform. The at least one useful token is provided to the merchant prior to payment card authorization, clearing, and settlement for the on-line transaction.

19 Claims, 7 Drawing Sheets

(56) References Cited

U.S. PATENT DOCUMENTS

| | | | |
|---|---|---|---|
| 5,687,322 A | 11/1997 | Deaton | |
| 5,857,175 A | 1/1999 | Day | |
| 6,012,038 A | 1/2000 | Powell | |
| 6,035,280 A | 3/2000 | Christensen | |
| 6,055,513 A | 4/2000 | Katz | |
| 6,067,526 A | 5/2000 | Powell | |
| 6,076,075 A * | 6/2000 | Teicher | 705/41 |
| 6,138,911 A | 10/2000 | Fredregill | |
| 6,223,163 B1 | 4/2001 | Van Luchene | |
| 6,292,786 B1 | 9/2001 | Deaton | |
| 6,307,958 B1 | 10/2001 | Deaton | |
| 6,334,108 B1 | 12/2001 | Deaton | |
| 6,424,949 B1 | 7/2002 | Deaton | |
| 6,484,146 B2 | 11/2002 | Day | |
| 6,601,036 B1 | 7/2003 | Walker | |
| 6,636,833 B1 | 10/2003 | Flitcroft | |
| 6,748,365 B1 | 6/2004 | Quinlan | |
| 6,847,935 B1 | 1/2005 | Solomon | |
| 6,925,441 B1 | 8/2005 | Jones, III | |
| 6,937,995 B1 | 8/2005 | Kepecs | |
| 7,111,789 B2 * | 9/2006 | Rajasekaran et al. | 235/472.01 |
| 7,136,835 B1 | 11/2006 | Flitcroft | |
| 7,555,444 B1 | 6/2009 | Wilson | |
| 7,580,856 B1 | 8/2009 | Pliha | |
| 7,992,773 B1 * | 8/2011 | Rothschild | 235/375 |
| 8,364,522 B1 * | 1/2013 | Gevelber | 705/5 |
| 8,424,752 B2 * | 4/2013 | Rothschild | 235/375 |
| 8,442,914 B2 * | 5/2013 | Killian et al. | 705/41 |
| 8,651,369 B2 * | 2/2014 | Rothschild | 235/375 |
| 2003/0042301 A1 * | 3/2003 | Rajasekaran et al. | 235/380 |
| 2003/0212595 A1 | 11/2003 | Antonucci | |
| 2004/0024638 A1 | 2/2004 | Restis | |
| 2004/0093271 A1 | 5/2004 | Walker et al. | |
| 2004/0143491 A1 | 7/2004 | Steinberg | |
| 2006/0003295 A1 * | 1/2006 | Hersch et al. | 434/110 |
| 2006/0006236 A1 * | 1/2006 | Von Fellenberg et al. | 235/458 |
| 2007/0198432 A1 * | 8/2007 | Pitroda et al. | 705/64 |
| 2007/0282687 A1 | 12/2007 | Laves | |
| 2008/0021772 A1 | 1/2008 | Aloni | |
| 2008/0120155 A1 | 5/2008 | Pliha | |
| 2009/0171777 A1 | 7/2009 | Powell | |
| 2009/0254930 A1 * | 10/2009 | Lo et al. | 725/2 |
| 2009/0271263 A1 * | 10/2009 | Regmi et al. | 705/14.17 |
| 2009/0288012 A1 * | 11/2009 | Hertel et al. | 715/738 |
| 2010/0110514 A1 * | 5/2010 | Houha et al. | 359/2 |
| 2010/0122274 A1 * | 5/2010 | Gillies et al. | 725/2 |
| 2010/0280896 A1 * | 11/2010 | Postrel | 705/14.29 |

OTHER PUBLICATIONS

Anonymous, "Coupons". downloaded from www.coupons.com on Jan. 8, 2010.

Anonymous, "Digital wallet" downloaded from http://en.wikipedia.org/wiki/Digital_wallet on May 7, 2013.

Business Editors, MasterCard Debuts Rewards Program for Small and Medium-Sized Financial Institutions, Business Wire, Jun. 30, 2003.

\* cited by examiner

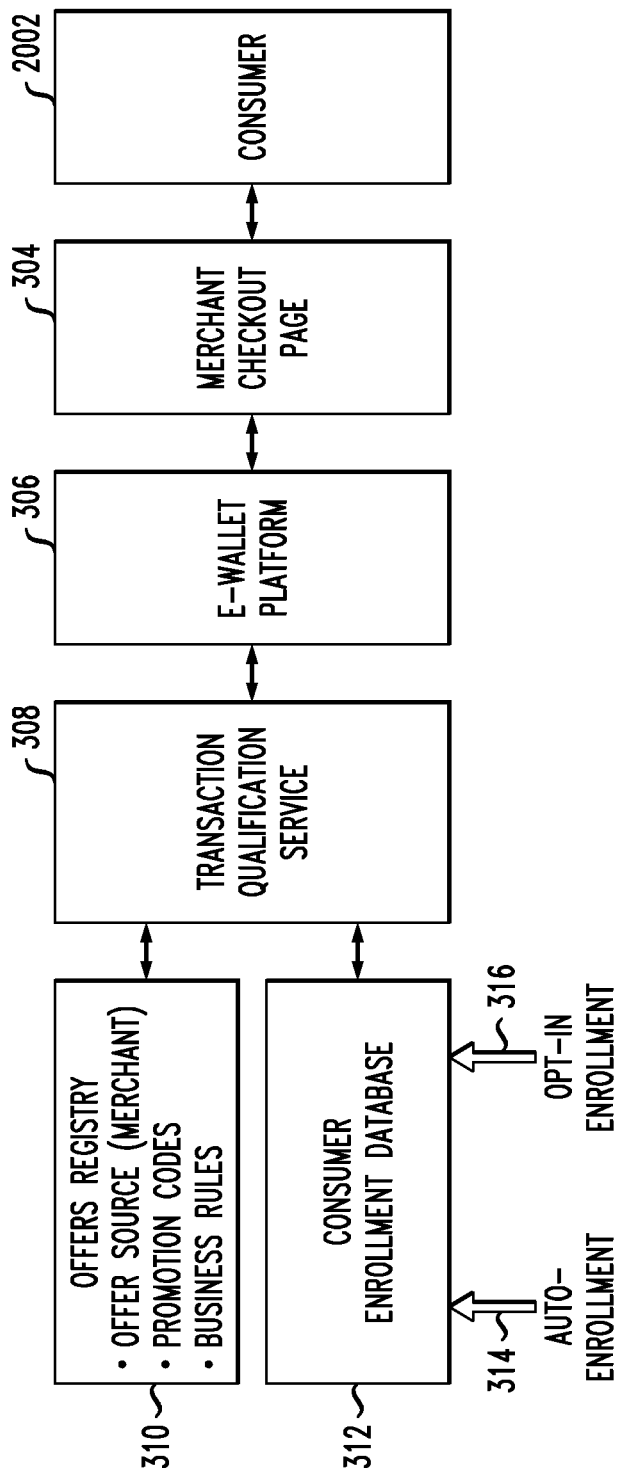

FIG. 4

| SUB-PROCESS | DESCRIPTION | PROVIDER (OPTIONS) |
|---|---|---|
| CONSUMER TARGETING | CONSUMER TARGETING BASED UPON MARKET OBJECTIVES AND CONSUMER CHARACTERISTICS | PNO, MERCHANT, ISSUER, AGENCY, OTHER |
| OFFER SET-UP | ADMINISTRATION OF AN OFFER WITHIN PNO'S OFFERS REGISTRY | PNO |
| OFFER DISTRIBUTION | OFFER MADE TO TARGETED CONSUMER AUDIENCE USING A RANGE OF COMMUNICATION MEDIA INCLUDING DIRECT MAIL, EMAIL, WEB, OTHER PRINT | PNO, MERCHANT, ISSUER, AGENCY, OTHER |
| CONSUMER ENROLLMENT | CONSUMER ENROLLMENT IS A STORED RECORD THAT ASSOCIATES THE OFFER CODE WITH A UNIQUE CONSUMER IDENTIFIER (e.g., PAN, USER ID, etc.). THE CONSUMER ENROLLMENT DATABASE SHOULD BE PROVIDED TO PNO IF NOT DIRECTLY HOSTED BY PNO. | PNO, MERCHANT, ISSUER, AGENCY, OTHER |
| CONSUMER OPT-IN | CONSUMER OPT-IN THROUGH EMAIL OR ONLINE RESPONSE TO OFFER. THE CONSUMER ENROLLMENT DATABASE SHOULD INDICATE CONSUMERS THAT HAVE OPTED-IN AND SHOULD BE PROVIDED TO PNO IF NOT DIRECTLY HOSTED BY PNO. | PNO, MERCHANT, ISSUER, AGENCY, OTHER |
| TRANSACTION QUALIFICATION | BASED UPON THE MERCHANT'S REQUEST DURING THE PURCHASE TRANSACTION, AN APPLICATION OF THE PREDEFINED QUALIFICATION RULE(S) TO THE CURRENT TRANSACTION AND/OR THE CONSUMER'S TRANSACTION HISTORY TO DETERMINE WHETHER A RELEVANT PRE-REGISTERED PROMOTION CODE MAY BE RETURNED TO THE MERCHANT | PNO |

FIG. 5

| SUB-PROCESS | DESCRIPTION | PROVIDER (OPTIONS) |
|---|---|---|
| PROMOTION CODE RESPONSE MESSAGE | BASED UPON THE MERCHANT'S REQUEST DURING THE PURCHASE TRANSACTION, A RELEVANT, PRE-REGISTERED PROMOTION CODE IS RETURNED TO THE MERCHANT | PNO |
| OFFER QUALIFICATION | AN APPLICATION OF THE PREDEFINED QUALIFICATION RULE(S) TO THE CURRENT TRANSACTION DETAILS (e.g., TICKET SIZE, LINE ITEM DETAILS, etc.) TO DETERMINE WHETHER THE OFFER IS TO BE PROVIDED TO THE CONSUMER) | MERCHANT |
| OFFER FULFILLMENT | THE OFFER IS PROVIDED TO THE CONSUMER (e.g., A REAL-TIME DISCOUNT IS APPLIED, VALUE IS PROVIDED SUCH AS FREE SHIPPING OR A BONUS ITEM) | MERCHANT |
| POST-TRANSACTION REPORTING | THE OUTCOME OF THE TRANSACTION MAY BE REPORTED BY THE MERCHANT, EITHER DIRECTLY TO THE TRANSACTION QUALIFICATION SERVICE OR VIA THE E-WALLET PLATFORM. THIS TRIGGERS AN UPDATE TO THE CONSUMER RECORD FOR THE PROMOTION CODE | PNO |

METHOD, APPARATUS, AND COMPUTER PROGRAM PRODUCT FOR FACILITATING PROMOTIONS WITH AN E-WALLET

CROSS-REFERENCE TO RELATED APPLICATIONS

This patent application claims the benefit of U.S. Provisional Patent Application Ser. No. 61/307,131 filed on Feb. 23, 2010, and entitled "METHOD, APPARATUS, AND COMPUTER PROGRAM PRODUCT FOR FACILITATING PROMOTIONS WITH AN E-WALLET." The disclosure of the aforementioned Provisional Patent Application Ser. No. 61/307,131 is expressly incorporated herein by reference in its entirety for all purposes.

FIELD OF THE INVENTION

The present invention relates generally to electronic commerce, and, more particularly, to electronic payment systems.

BACKGROUND OF THE INVENTION

In today's electronic commerce environment, many retailers have adopted the practice of providing discounts and promotional incentives to consumers. A prevalent method used is the manually-entered promotion code. With this approach, a pre-defined code string (usually an alpha-numeric character sequence between four and ten characters in length) is defined by the retailer to represent a particular discount (percentage or absolute dollar amount) and a set of criteria or rules for qualification (e.g., dates, stock-keeping units (SKUs), minimum total purchase amount, and the like) These codes are made available to consumers through a variety of communication channels, including e-mail, web sites, direct mail, other printed material, and so on. Consumers are prompted to enter the codes on the respective retailer's electronic commerce check-out page. The retailer's point of sale (POS) system checks the validity of the code and the consumer order against the qualification criteria associated with the code. If qualified, the retailer makes the appropriate adjustment to the price or other order adjustment (e.g., free product or service).

SUMMARY OF THE INVENTION

Principles of the present invention provide techniques for facilitating promotions with an e-wallet. An exemplary embodiment of a method (which can be computer-implemented), according to one aspect of the invention, includes the steps of obtaining, by an electronic wallet platform, from a check-out web page of a merchant, (i) a unique identification of a given consumer, of a plurality of consumers, who is purchasing at least one item from the merchant in an on-line transaction, and (ii) associated transaction data. Additional steps include supplying, by the electronic wallet platform, to a transaction qualification service, the unique identification of the given consumer; retrieving, by the transaction qualification service, from a consumer enrollment database, a record wherein at least one useful token is stored in association with the unique identification of the given consumer; and determining, by the transaction qualification service, based on rules from an offers registry database, whether the at least one useful token is applicable to the on-line transaction, the rules being stored in the offers registry database in association with the at least one useful token, the rules taking into account at least one of the unique identification of the given consumer and the associated transaction data in determining the applicability. If, based on the determining step, the at least one useful token is applicable to the on-line transaction, a further step includes providing the at least one useful token to the merchant, using the transaction qualification service and the electronic wallet platform, the at least one useful token being provided to the merchant prior to payment card authorization, clearing, and settlement for the on-line transaction.

Aspects of the invention contemplate the method(s) performed by one or more entities herein, as well as facilitating of one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 is a block diagram of an exemplary system, according to an aspect of the invention;

FIGS. 4 and 5 present a table of various exemplary sub-processes undertaken in one or more embodiments of the invention, together with corresponding exemplary descriptions of the sub-processes, and examples of parties who may carry out the sub-processes;

DETAILED DESCRIPTION OF PREFERRED EMBODIMENTS

Figure 1:
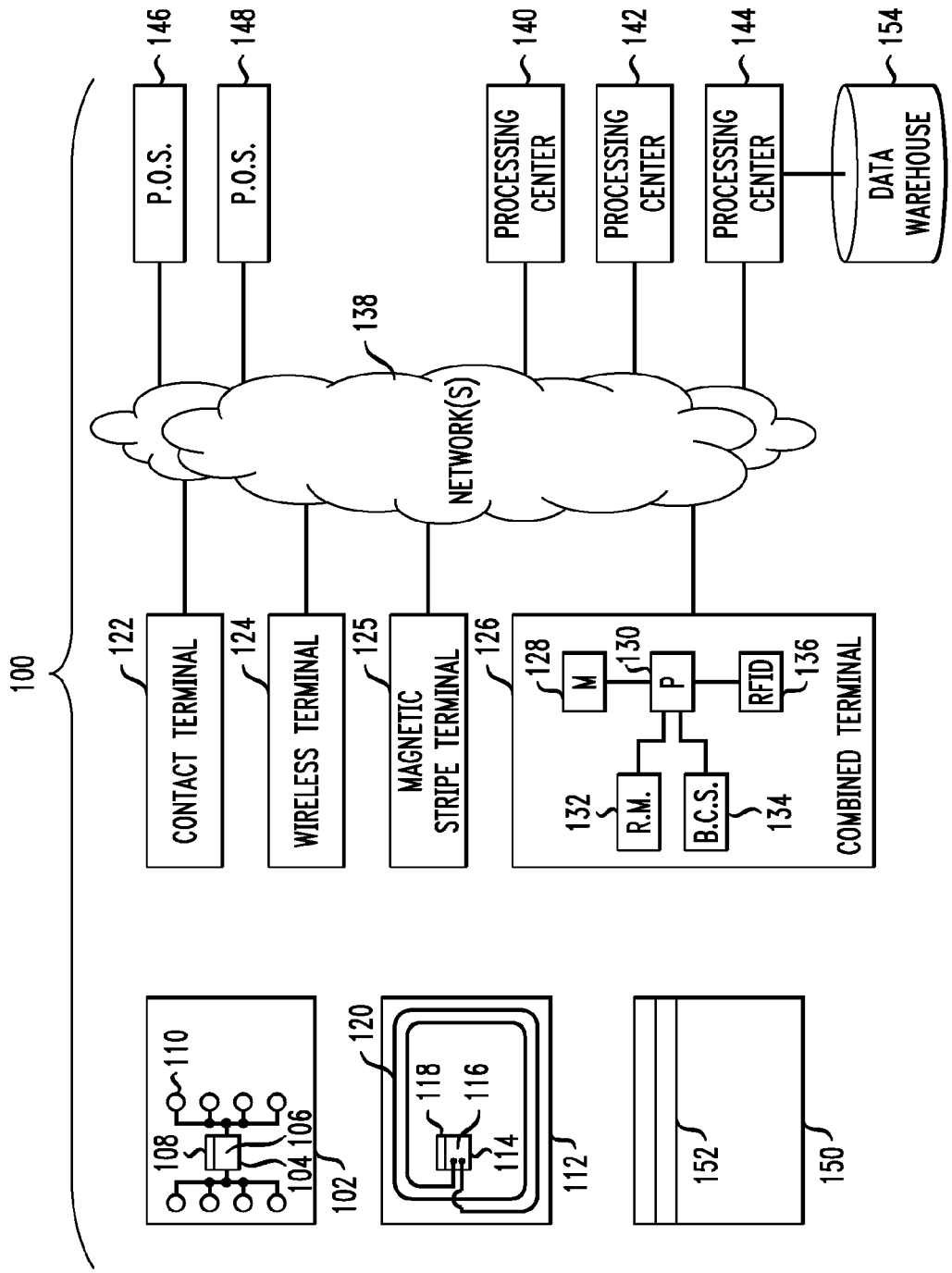
FIG. 1 shows a general example of a payment system that can implement techniques of the invention.

Attention should now be given to FIG. 1, which depicts an exemplary embodiment of a system 100, according to an aspect of the invention, and including various possible components of the system. It should be noted that for generality, presentation of physical cards to terminals will be described. However, one or more embodiments of the invention are particularly useful for card-not-present Internet commerce transactions. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. Other types of devices used in lieu of or in addition to "smart" or "chip" cards 102, 112 could include a conventional card 150 having a magnetic stripe 152, an appropriately configured cellular telephone handset, and the like. Indeed, techniques can be adapted to a variety of different types of cards, terminals, and other devices, configured, for example, according to a payment system standard (and/or specification).

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions or units 108, 118 can store the operating system of the cards 102, 112. The operating system loads and executes applications and provides file management or other basic card services to the applications. One operating system that can be used is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

As noted, cards 102, 112 are examples of a variety of payment devices that can be employed. The primary function of the payment devices may not be payment, for example, they may be cellular phone handsets. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more method steps. The applications can be, for example, application identifiers (AIDs) linked to software code in the form of firmware plus data in a card memory such as an electrically erasable programmable read-only memory (EEPROM). Again, note that "smart" or "chip" cards are not necessarily required and a conventional magnetic stripe card can be employed; furthermore, as noted above, one or more embodiments are of particular interest in the context of card-not-present Internet transactions.

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any type of device 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (for example, a virtual private network, such as the BANKNET® virtual private network (VPN) of MasterCard International Incorporated off Purchase, New York, USA). More than one network could be employed to connect different elements of the system. More than one network could be employed to connect different elements of the system. For example, a local area network (LAN) could connect a terminal to a local server or other computer at a retail establishment. A payment network could connect acquirers and issuers. Further details regarding one specific form of payment network will be provided below. Processing centers 140, 142, 144 can include, for example, a host computer of an issuer of a payment device (or processing functionality of other entities discussed in other figures herein).

Many different retail or other establishments, as well as other entities, generally represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

Again, conventional magnetic stripe cards 150 can be used instead of or together with "smart" or "chip" cards.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128, which then contactlessly transmits the electronic data to the proximity IC chip in the card 112 or other wireless device. Magnetic stripe cards can be swiped in a well-known manner. Again, in one or more instances, the card number is simply provided via web site, in a card-not-present transaction, or the like.

One or more of the processing centers 140, 142, 144 can include a database such as a data warehouse 154.

As mentioned several times, one or more embodiments are of particular interest in the context of card-not-present Internet transactions. In such cases, the card or other device is not presented to terminal 122, 124, 125, or 126. Rather, appropriate card information (e.g., primary account number (PAN), cardholder name, cardholder address, expiration date, and/or security code, and so on) is provided to a merchant by a consumer using a web site or the like. The merchant then uses this information to initiate the authorization process.

Figure 2:
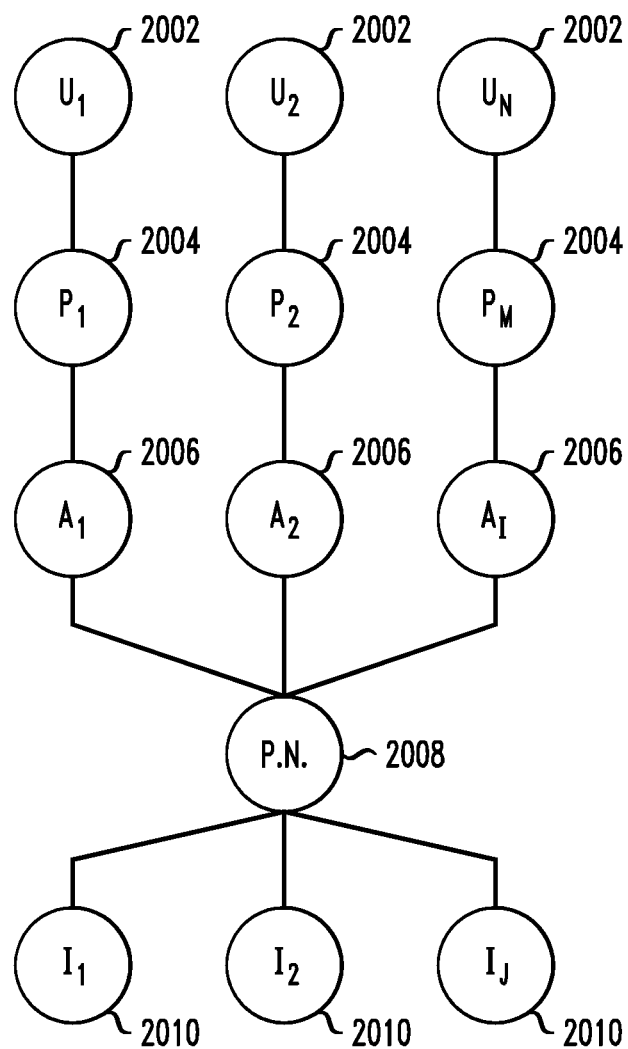
FIG. 2 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 2, an exemplary relationship among multiple entities is depicted. A number of different users (e.g., consumers such as on-line shoppers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISA-NET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. During Internet commerce, for example, the cardholder may simply provide the card number, expiration date, security code, and/or other pieces of data described above to the merchant, who prepares an authorization request based upon same without actually seeing the physical card. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed with other kinds of payment networks, for example, proprietary or closed payments networks with only a single issuer and acquirer.

As noted, in today's electronic commerce environment, many retailers have adopted the practice of providing discounts and promotional incentives to consumers. A prevalent method used is the manually-entered promotion code. With this approach, a pre-defined code string (usually an alphanumeric character sequence between four and ten characters in length) is defined by the retailer to represent a particular discount (percentage or absolute dollar amount) and a set of criteria or rules for qualification (e.g., dates, stock-keeping units (SKUs), minimum total purchase amount, and the like) These codes are made available to consumers through a variety of communication channels, including e-mail, web sites, direct mail, other printed material, and so on. Consumers are prompted to enter the codes on the respective retailer's electronic commerce check-out page. The retailer's point of sale (POS) system checks the validity of the code and the consumer order against the qualification criteria associated with the code. If qualified, the retailer makes the appropriate adjustment to the price or other order adjustment (e.g., free product or service).

Given the ease with which information may be passed in today's connected environment, and the tangible value inherent in promotion codes, promotion codes are widely shared across the interne by consumers and a wide variety of businesses that have formed a secondary market of sorts, trading in promotion codes and coupons. Promotion codes tend to reach consumers through a variety of channels, including printed materials, advertisements, e-mail, and on-line communications. In the typical scenario, consumers are required to save, record, or otherwise remember the code until manually entered into the promotion code entry field on the merchant checkout page.

MasterCard International Incorporated of Purchase, New York, USA has offered a tool to deliver electronic promotion qualification and fulfillment for a number of years. The MasterCard® Rewards System (MRS) has the ability to score transactions that are processed through the MasterCard® Global Clearing Management System (GCMS) or received in batch files from third parties (e.g., merchants, acquirers, issuers, and the like), and to issue statement credits to MasterCard® payment card accounts that qualify under pre-defined promotion rules. In some cases, one or more embodiments of the invention can be implemented by modifying an existing solution such as the MRS platform based on the teachings herein, making use, for example, of appropriate business rules, scoring, offers database, and/or cardholder database functionality.

One or more embodiments of the invention advantageously work in conjunction with an electronic wallet (e-wallet), also known as a digital wallet. An e-wallet provides consumers with a secure and convenient way to pay for purchases from accepting on-line merchants. Upon registration, consumers may store their card, billing and shipping information on a site hosted by a suitable entity (for example, an operator of a payment network 2008), and may access that information to pay conveniently and securely across participating merchants. The e-wallet platform may deliver additional security with the use of "virtual" account numbers to mask cardholders' real information.

The aforementioned use of "virtual" account numbers, also known as PAN mapping, can be, for example, a network service that an operator of a payment network 2008 (e.g., an entity such as MasterCard International Incorporated) provides to issuers; in other instances, issuers may elect to use their own solution. The PAN mapping process involves taking the original Primary Account Number (PAN) and issuing a pseudo-PAN (or virtual card number) in its place. This provides security against the possibility of the original PAN becoming compromised. A non-limiting example of PAN mapping is that offered under the "one time use number" feature of MasterCard International Incorporated's in-Control™ payment solutions platform. The skilled artisan will be familiar with a variety of PAN mapping techniques, and, given the teachings herein, will be able to adapt same to one or more embodiments of the invention. For example, the payment network operator may create a translation table wherein external-facing instances of the number present the pseudo-PAN while internal-facing instances present the actual PAN. Commercially available PAN-mapping solutions which may be adapted to embodiments of the invention, given the teachings herein, include those available from Orbiscom Ltd., Block 1, Blackrock Business Park, Carysfort Avenue, Blackrock, Co. Dublin, Ireland (now part of MasterCard International Incorporated of Purchase, New York, USA); by way of example and not limitation, techniques of U.S. Pat. Nos. 6,636,833 and 7,136,835 of Flitcroft et al., the complete disclosures of both of which are expressly incorporated herein by reference in their entireties for all purposes.

In one or more embodiments, merchants that participate in the e-wallet service will have to register with a suitable entity (for example, an operator of a payment network 2008) to receive a digital certificate, used when integrating their e-commerce services with an e-wallet platform over a mutually authenticated secure socket layer (SSL) connection. When a shopper selects the e-wallet option on a participating merchant's site, the merchant site will pass a variety of transaction information, (e.g., merchant name, merchant return link, session ID) to the e-wallet platform. After the consumer logs into the e-wallet platform using his or her ID and password, and selects his or her payment and shipping options, the e-wallet platform passes payment details back to the merchant (e.g., the virtual card number (VCN) or real card number (RCN), expiration date, shopper name and contact information, ship-to details, and so on). The merchant may then present the final transaction details for confirmation before submitting the transaction for authorization and clearing.

It should be noted that the person of ordinary skill in the art will be familiar with e-wallets per se, and, given the teachings herein, will be able to adapt same for implementing one or more embodiments of the invention. Non-limiting examples of known e-wallets include the PayPal service (mark of PayPal subsidiary of eBay, Inc., San Jose, Calif., USA); the Checkout by Amazon service (mark of Amazon.com, Inc., Seattle, Wash., USA); and the Google Checkout service (mark of Google, Inc. Mountain View, Calif., USA).

In one or more embodiments, e-wallet functionality is extended to effectively provide valuable incentives to a highly targeted audience in a controlled and measurable way. By leveraging the interaction that occurs during the checkout process between a merchant electronic site and the aforementioned e-wallet platform, a suitable entity (for example, an operator of a payment network 2008) can provide to merchants the controls within a promotional campaign to reduce or eliminate viral distribution of an offer (e.g., a promotion code); ensure that the consumer taking advantage of the offer is indeed one who is intended to participate; apply additional qualification filters within the e-wallet platform beyond those generally available on most merchant electronic point-of-sale (ePOS) platforms (e.g., qualify on $X^{th}$ transaction, qualify after accumulating $X of spend); and/or improve the consumer's on-line shopping experience.

Furthermore, in one or more embodiments, a suitable entity (for example, an operator of a payment network 2008) can offer consumers convenience in the offer redemption process by storing promotion codes, thus eliminating the consumer's need to record or recall the code; passing promotion codes to merchants, thus eliminating the consumer's manual keying process; and/or providing added management features, such as purging expired codes.

With attention now to FIG. 3, there are two different ways for a consumer to be enrolled in consumer enrollment database 312. As at 314, auto-enrollment is possible, based, for example, on accounts that payment network operator (PNO) 2008 maintains; certain accounts may be segmented and enabled for participation. As at 316, in another aspect, the consumer may be required to opt in. This could be carried out, for example, by having PNO 2008 or some other entity carry out an analysis or check some other consumer database, to undertake an outreach, inviting one or more consumers to opt in. This could be selective (targeted) or open. In essence, some action is taken on the part of the consumer to register. In many cases, this can be carried out on-line or via mobile messaging, or using a clickable link in an e-mail. The consumer enrollment database 312 manages all the registered consumers. It ultimately maps back to an e-wallet account; e.g., via credit or debit card account or through the wallet account itself.

Offers registry 310 typically involves business-to-business interaction. The rules of the offer are determined by whoever provides the offer, whether a merchant, manufacturer, issuing bank, and so on. The appropriate entity provides the rules of the offer, the merchants at which the rules apply, a code range or some kind of identification scheme for the offer, and so on. A single identifier could be used for everyone to receive the offer; serialized identifiers could be provided, and so on. This information is stored in the offers registry 310.

Transaction qualification service 308 applies the rules in real time, based on registry 310 and database 312. Service 308 applies the rules of the registered offer to transaction information coming through for the given consumer and determines if all the pieces are in place to qualify. Service 308 then updates that particular consumer's registration and transaction records.

E-wallet platform 306 provides the interaction between the merchant and the consumer 2002 as the transaction that is to be qualified. Consumer 2002 goes to merchant checkout page 304 and when the consumer indicates that he or she wishes to pay with the e-wallet, he or she is re-routed to the e-wallet platform 306 and pertinent transaction information provided by the merchant is then run through the transaction qualification service 308. If a promotion is applicable, pass this information back to e-wallet platform 306, and when the consumer completes interaction with e-wallet platform 306, that information passes back to the merchant, as part of the interface between e-wallet platform 306 and the merchant. If the merchant wants to accept e-wallet platform 306, there will be certain messages the merchant will pass to e-wallet platform 306 and certain messages the merchant will receive back from e-wallet platform 306.

With attention now to FIGS. 4 and 5, the end-to-end promotion process can be broken down into several sub-processes. Many of these can either be provided by an operator of a payment network 2008 or by another party.

Consumer Targeting

The targeting function per se is a common element of traditional direct marketing. Advantageously, in one or more embodiments of the invention, an operator of a payment network 2008 is in a position to leverage historical transaction data to determine behavioral characteristics of consumers and their propensity to spend in specified categories. Of course, such activities must be carried out in full compliance with all applicable rules and regulations, and must respect privacy rights. In some instances, operator of a payment network 2008 may perform the targeting function for merchants 2004 on behalf of issuers 2010. Other target methods could be applied by operator of a payment network 2008 or by other parties to identify the target audience for a promotion. When the operator of a payment network 2008 performs the targeting, the consumer's PAN (primary account number; credit or debit card number) may be used as a unique identifier in subsequent steps in the process. If an alternative targeting approach is taken, then an alternate unique identifier should be generated and used.

Thus, this sub-process generally involves consumer targeting based upon market objectives and consumer characteristics, and may be carried out, for example, by the operator of a payment network 2008 (abbreviated in FIGS. 4 and 5 as a "PNO"), merchant 2004, issuer 2010, an agency, or another entity.

Offer Set-Up

Each offer should be established as a record in offers registry 310 (preferably managed by the operator of a payment network 2008. The offer record should include the applicable source (merchant), the start and end date of the promotion, the promotion code, and any qualification criteria that the system may apply before determining if a promotion code should be passed to a merchant for a given transaction (e.g., spend or transaction thresholds at the given merchant, time of day constraints, and the like).

Thus, this sub-process generally involves administration of an offer within offers registry 310, and may be carried out, for example, by the operator of a payment network 2008.

Offer Distribution

The distribution of promotion codes to consumers is, in and of itself, a standard practice today across a broad spectrum of media including on-line, print, e-mail, and the like. These same channels may be leveraged for the offer distribution process in one or more embodiments of the invention. Electronic distribution (web, e-mail or mobile) is a desirable format to use when an opt-in step is required of the consumer, given the interactivity available through these channels.

Thus, this sub-process generally involves an offer made to a targeted consumer audience using a range of communication media including direct mail, e-mail, web, other print media, and the like, and may be carried out, for example, by the operator of a payment network 2008 (abbreviated in FIGS. 4 and 5 as a "PNO"), merchant 2004, issuer 2010, an agency, or another entity.

Consumer Enrollment and Consumer Opt-in

For each consumer 2002 that may qualify for an offer, an association should be established between that consumer (represented by a suitable consumer ID) and the corresponding promotion code. Such association should be accessible to the transaction qualification service 308 (and preferably to the offers registry 310 as well), and ultimately, to the e-wallet platform 306. This may be accomplished in several ways, depending upon the implementation and the opt-in requirements of the program. An auto-enrollment process may be used for the entire target audience, as at 314. However, if an opt-in process 316 is required (as is often the case), a simple activation link in an on-line message may be used to trigger selective enrollment. Other modes of opt-in are also possible.

Thus, the consumer enrollment sub-process generally involves a stored record that associates the offer code with a unique consumer identifier (e.g., PAN, user ID, etc.). The consumer enrollment database 312 should be provided to the PNO 2008 if not directly hosted by PNO. The consumer enrollment sub-process may be carried out, for example, by the operator of a payment network 2008, merchant 2004, issuer 2010, an agency, or another entity.

Furthermore, the consumer opt-in sub-process generally involves consumer opt-in through e-mail or on-line response to the offer. The consumer enrollment database 312 should indicate consumers that have opted-in and should be provided to PNO 2008 if not directly hosted by PNO. The consumer opt-in sub-process may be carried out, for example, by the operator of a payment network 2008, merchant 2004, issuer 2010, an agency, or another entity.

Transaction Qualification

The transaction qualification system 308 should process requests for a qualifying promotion code from the e-wallet platform 306. These requests should be resolved based upon the criteria established in the offers registry 310 during the offer set-up step.

Thus, the transaction qualification sub-process generally involves, based upon the merchant's request during the purchase transaction, an application of the predefined qualification rule(s) to the current transaction and/or the consumer's transaction history to determine whether a relevant pre-registered promotion code may be returned to the merchant. The transaction qualification sub-process may be carried out, for example, by the operator of a payment network 2008.

Promotion Code Response

If a promotion code applies, it will be returned to the merchant via the e-wallet platform 306. In particular, based upon the merchant's request during the purchase transaction, a relevant, pre-registered promotion code is returned to the merchant. The promotion code response sub-process may be carried out, for example, by the operator of a payment network 2008.

Offer Qualification and Fulfillment

Once the promotion code is passed to the merchant, final qualification of the offer is performed by the merchant's POS and appropriate adjustments are made to the basket and/or the final pricing. In particular, offer qualification involves an application of the predefined qualification rule(s) to the current transaction details (e.g., ticket size, line item details, etc.) to determine whether the offer is to be provided to the consumer. Furthermore, in offer fulfillment, the offer is provided to the consumer (e.g., a real-time discount is applied, value is provided such as free shipping or a bonus item, and the like). The offer qualification and fulfillment sub-processes may be carried out, for example, by the merchant 2004.

Post-Transaction Reporting

After the transaction is completed, the merchant may be afforded the option to report the outcome of the transaction back to the e-wallet platform 306 or the transaction qualification service 308. The consumer enrollment database 312 is updated to reflect the outcome appropriately. This provides several potential advantages for the merchant, namely, the system will take the appropriate action after transaction results are reported (e.g., de-activate a redeemed promotion code for the relevant consumer, register an incremental redemption of the promotion code for the relevant consumer, and the like); and/or promotion metrics may be more accurately reported by the system.

Thus, in the post-transaction reporting sub-process, the outcome of the transaction may be reported by the merchant, either directly to the transaction qualification service 308 or via the e-wallet platform 306. This triggers an update to the consumer record for the promotion code. The post-transaction reporting sub-process may be carried out, for example, by the operator of a payment network 2008.

Recapitulation

Figure 6:
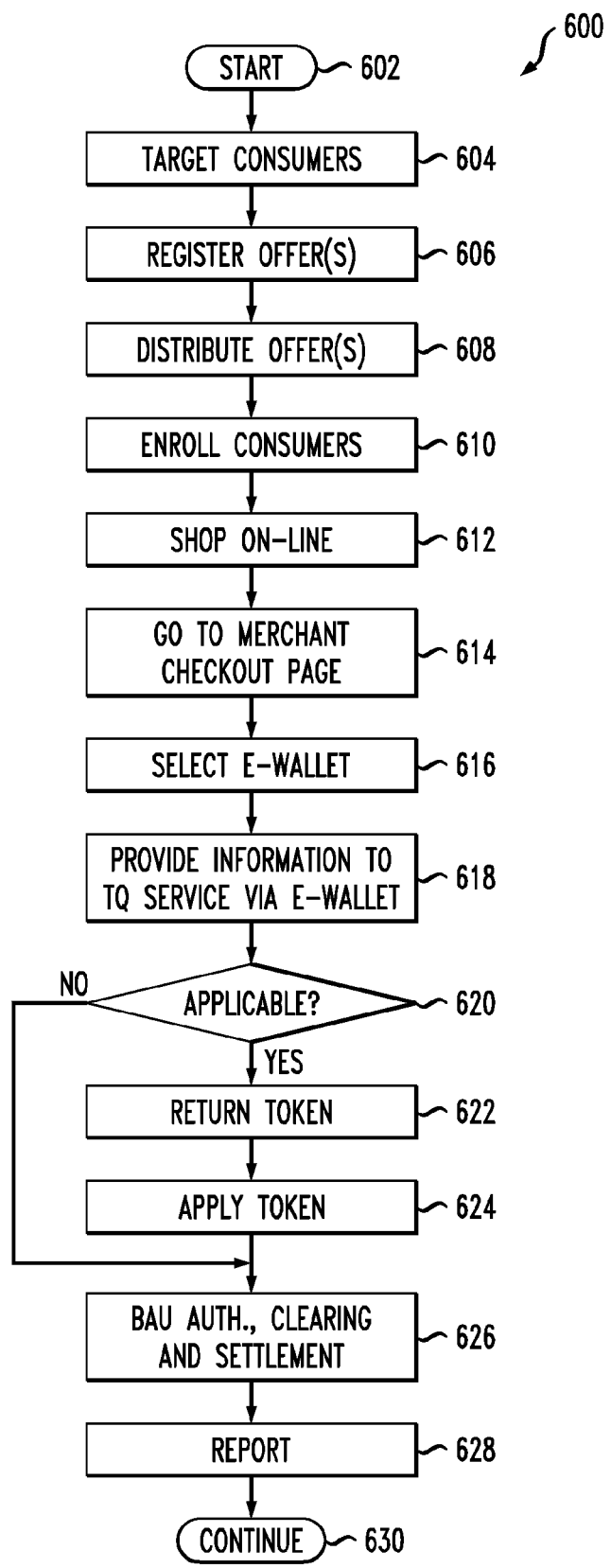
FIG. 6 is a flow chart of an exemplary method, according to another aspect of the invention.

Attention should now be had to flow chart 600 of FIG. 6, which begins in block 602. Given the discussion thus far, it will be appreciated that, in general terms, an exemplary method, according to an aspect of the invention, includes the step of obtaining, by an electronic wallet platform 306, from a check-out web page 304 of a merchant: (i) a unique identification of a given consumer, of a plurality of consumers, who is purchasing at least one item from the merchant in an on-line transaction, and (ii) associated transaction data. The method also includes the step of supplying, by the electronic wallet platform 306, to a transaction qualification service 308, the unique identification of the given consumer. These steps are generally depicted in FIG. 6 as step 618.

As noted above, in some instances, the consumer's PAN (primary account number; credit or debit card number) may be used as the unique identification. In other instances, an alternate unique identifier could be generated and used. Furthermore, the associated transaction data could include, by way of a non-limiting example, merchant name, merchant return link, session ID, and the like. In some instances, the associated transaction data may include an identifying indicia of the at least one item (for example, a stock-keeping unit or SKU; a universal product code or UPC, or some other code such a as a special code for prescription drugs or the like).

A further step includes retrieving, by the transaction qualification service 308, from a consumer enrollment database 312, a record wherein at least one useful token is stored in association with the unique identification of the given consumer. A still further step includes determining, by the transaction qualification service 308, based on rules from an offers registry database 310, whether the at least one useful token is applicable to the on-line transaction. These two steps are generally depicted inn FIG. 6 as decision block 620. The rules are stored in the offers registry database 310 in association with the at least one useful token, the rules take into account the unique identification of the given consumer and/or the associated transaction data, in determining the applicability.

As per the "YES" branch of block 620, if, based on the determining step, the at least one useful token is applicable to the on-line transaction, provide the at least one useful token to the merchant, as per block 622, using the transaction qualification service 308 and the electronic wallet platform 306. The at least one useful token is provided to the merchant prior to payment card authorization, clearing, and settlement for the on-line transaction (discussed below with respect to optional step 626).

A promotion code (such as an online merchant discount code) is a non-limiting example of the at least one useful token. As will be discussed in greater detail below, it could be another type of code or string of data of use to the merchant; a representation of points; some other type of identifier (to gauge response to a targeted advertisement), and the like. The token is not necessarily limited to an offer or discount; it might just include information that the given consumer had been part of an earlier communication.

In an optional additional step 624, subsequent to receiving the promotion code, the merchant revises a monetary amount associated with the on-line transaction (i.e., in accordance with the code, for example, by applying the discount or the like). In an optional additional step 626, subsequent to the merchant revising the monetary amount associated with the on-line transaction, the merchant initiates the payment card authorization, clearing, and settlement for the on-line transaction, based on the revised monetary amount, typically in a "business as usual" manner.

In step 620, in some cases, the rules may take into account, for example, the associated transaction data; the associated transaction data can include an identifying indicia, as discussed above, of the at least one item.

In step 620, in some cases, the rules may take into account the unique identification of the given consumer; for example, by accessing the given consumer's transaction history based on the unique identification of the given consumer. Information pertaining to the consumer's transaction history can be stored, for example, in a data warehouse 154 operated by an operator of payment network 2008; or the transaction history may already be available on one or more platforms and accessed by the operator of payment network 2008; e.g., on an issuer platform operated by an issuer or an issuer processor; within an existing e-wallet, and so on. Other possible locations will also be apparent to the skilled artisan, given the teachings herein.

In an optional additional step 628, the merchant can report the outcome of the on-line transaction to the electronic wallet platform and/or the transaction qualification service.

Processing continues in block 630.

In the event that block 620 returns "NO," the return and application of the token may be bypassed and processing may proceed, for example, to step 626. In at least some instances, it may be desirable to provide report 628 even when a "NO" is returned in block 620—for example, where several purchases are needed to become eligible.

In an optional additional step 616, the consumer affirmatively selects the e-wallet 306; for example, in response to a prompt which prompts the given consumer to select the electronic wallet platform from the check-out web page (perhaps as simple as a button or selectable link to the e-wallet). Of course, it will be appreciated that prior to such point, the given consumer will typically have shopped on-line, as per step 612, and then navigated to the merchant check-out page 304 as per step 614.

An optional additional step 604 includes the operator of the payment card network 2008 targeting the plurality of consumers in connection with an offer associated with the promotion code. A further optional additional step 606 includes populating the offers registry database 310. A still further optional additional step 610 includes enrolling the consumers. In some cases, this step includes automatically enrolling the plurality of consumers in the consumer enrollment database. In another aspect, an additional optional step 608 includes distributing an offer associated with the promotion code to at least the plurality of consumers. Step 610 then involves accepting enrollment of the plurality of consumers, in the consumer enrollment database, in response to the offer. Offers may of course be distributed to a larger group of consumers than those who ultimately choose to register.

Any one, some, or all of the following steps can be carried out or facilitated by PNO 2008: 604, 606, 608, 610, 618, 620, 622, 626, 628. The payment network of PNO 2008 may be, for example, of the kind wherein the operator is a single operator which facilitates transactions between multiple issuers and multiple acquirers, as per FIG. 2.

As discussed further below, another optional step includes providing a system, wherein the system includes distinct software modules, each embodied on at least one tangible computer readable recordable storage medium, including an electronic wallet platform module to implement block 306, a transaction qualification service module to implement block 308, a consumer enrollment database module to implement block 312, and an offers registry database module to implement block 310. The blocks may be implemented by the software modules together with corresponding memories and one or more processors. In a preferred but non-limiting approach, elements 306, 308, 310, and 312 are each separate software modules and each runs on its own server with its own processor(s) and memory(ies).

With reference again to FIG. 3, it will be appreciated that, in general terms, an exemplary system, according to an aspect of the invention, includes an electronic wallet platform 306 configured to obtain, from a check-out web page 304 of a merchant: (i) a unique identification of a given consumer 2002, of a plurality of consumers, who is purchasing at least one item from the merchant in an on-line transaction, and (ii) associated transaction data. The system further includes a transaction qualification service 308 in data communication with the electronic wallet platform. The electronic wallet platform is further configured to supply, to the transaction qualification service, the unique identification of the given consumer. Also included is a consumer enrollment database 312 in data communication with the transaction qualification service. The transaction qualification service is further configured to retrieve, from the consumer enrollment database, a record wherein at least one useful token is stored in association with the unique identification of the given consumer.

The exemplary system still further includes an offers registry database 310 in data communication with the transaction qualification service. The transaction qualification service is still further configured to determine, based on rules from the offers registry database, whether the at least one useful token is applicable to the on-line transaction. The rules are stored in the offers registry database in association with the at least one useful token, and the rules take into account the unique identification of the given consumer and/or the associated transaction data, in determining the applicability. The transaction qualification service 308 and the electronic wallet platform 306 are further configured to provide the at least one useful token to the merchant, if, based on the determining, the at least one useful token is applicable to the on-line transaction. The at least one useful token is provided to the merchant prior to payment card authorization, clearing, and settlement for the on-line transaction.

The comments elsewhere herein regarding the at least one useful token, the rules from the offers registry database, the associated transaction data, the unique identification of the given consumer are also applicable to the description of the exemplary system.

As noted elsewhere, the electronic wallet platform and/or the transaction qualification service can be further configured so as to receive, from the merchant, a report of the outcome of the on-line transaction.

A variety of different networking techniques can be used to interconnect the various blocks in FIG. 3.

Thus, it will be appreciated that in one or more embodiments of the invention, alphanumeric promotion codes are collected in an offer registry by an operator 2008 of a payment network. Such operator 2008 provides functionality whereby merchants or the operator itself can tag consumers with specific promotion codes transparent to the actual consumer; the consumer does not need to handle a promotion code. Promotion codes are not limited to discounts, but may also include, for example, double points, get an extra dollar amount for spending a certain amount, etc.

In an optional preliminary step, a merchant has an interest in targeting and segmenting the market. Potentially, operator 2008 can, as noted, assist the merchant in this process, based on information the network operator has about consumer behavior (subject to applicable laws, regulations, and privacy concerns, as set forth elsewhere herein). When undertaking the segmentation, operator 2008 can potentially identify the specific card accounts that are targeted; in essence, pre-qualifying consumers as valid recipients of an offer, based on the consumers' card accounts.

Again, targeting is optional and can be carried out in a variety of ways: by PNO 2008; by the merchant, and so on. Alternatives to targeting include, by way of example and not limitation, using advertisements; making a promotion available to the first X people (e.g., 200) to visit the web site, and so on.

After pre-selecting consumers, it may be desirable to automatically enroll them in an offer, as at 314, or it may be desirable to present them with an opt-in message, as at 316, so they can take some action to indicate that they want the offer. One non-limiting example includes opt-in using an e-mail with a clickable link that sends a string (unique identifier) indicating that the particular recipient has opted in. The list of enrolled consumers is stored in database 312 (for example a list of PANs or other consumer identifiers).

Details of the promotions are known due to parallel set-up undertaken with the discounter (whoever is offering and/or funding the promotion; for example, a merchant, manufacturer, or the like). The discounter has provided the operator 2008 with the parameters for the promotion itself, and the same are present on offers registry 310. The parameters may include, for example, available dates, the type of benefit the consumer will get such as dollars off, percent off, free shipping, points, and the like. The parameters may be set up as a set of rules.

At this point, consumers and promotions have both been registered and a linkage exists between these things; that is, it is now known that a consumer is qualified for a promotion; all he or she has to do is undertake the correct action to redeem such promotion.

Consider now e-wallet platform 306. Consumers have an account that allows them to store methods of payment (e.g., any kind of payment card or account) and then the consumer can use the overriding account. At the e-commerce merchant web site check out page 304, select "Pay with e-wallet" and the underlying payment method is masked. Thus, the consumer fills his or her shopping cart, selects payment as "Pay with e-wallet," and is then re-directed to an interface with the e-wallet product 306. The merchant passes transaction information as part of the handoff (price, etc.). Operator 2008 associates the transaction to a pre-registered promotion and checks to see whether the promotion rules are satisfied, using service 308. The consumer then chooses which (of potentially many) payment methods to use within the e-wallet; e.g., "Card X." Operator 2008 then passes the information needed for payment and the promotion code back to the merchant. In one or more embodiments, all the actions just described take place prior to the merchant submitting the transaction for authorization as described with respect to FIG. 2. The merchant can now use that code to adjust the ticket or provide whatever other benefit is appropriate, and then process the transaction in accordance with the normal process, i.e., submitting an authorization request for the sale amount (after any discount based on the promotion) to its acquirer, through the network 2008, and to the issuer of the consumer's card.

It should be noted that the examples herein, involving a promotion code, are non-limiting. Instead of passing a promotion code to the merchant, anything of use to the merchant can be passed. While this is typically an online merchant discount code it could be another type of code or string of data of use to the merchant; another type of identifier is possible. For example, the merchant might have done a targeted advertisement and wants to see who is coming back to shop. The code is not necessarily limited to an offer or discount; it might just include information that this person had been part of an earlier communication. It could be a code that represented points, and is not limited to things triggered by typical on-line promotion codes. Thus, in a broad aspect, it may be any type of token that is of use to the merchant; the online promotion code is simply a preferred but non-limiting example.

To summarize, in an optional step, a merchant and an operator of a payment network 2008 collaborate together to identify certain cardholders who should be given an offer. Those cardholders are either automatically signed up as at 314, or are provided with a chance to opt-in, as at 316, using, for example, an e-mail and a link. In parallel, the merchant provides to the payment network operator parameters defining the special offer or other benefit to be made available to the consumer, e.g., fixed amount or percentage off, free shipping, how long the promotion is good for, etc. The consumer goes to the web site and makes a purchase. When checking out at page 304, the consumer opts to use the e-wallet platform 306, rather than simply entering an actual card number. In using e-wallet platform 306, various parameters are passed to the payment network operator 2008 (running the platform 306) from the merchant, which allow operator 2008 to determine if the person is in fact eligible to receive a promotion (using service 308, based upon database 312 and registry 310). If so, operator 2008 returns to the merchant conventional payment information as well as the promotion code (or other useful token), which can then be applied by the merchant in determining whether free shipping should be given, a discount offered, etc.

Optionally, a post-transaction reporting step can be provided. Absent such a step, it would not be apparent to service 308 whether the transaction was ever completed with the discount or other promotion. Accordingly, it may well be in the merchant's best interest to provide some kind of outcome to PNO 2008 so that PNO 2008 knows whether to show in the consumer's record that the discount or other promotion has been redeemed, so that the rules of the promotion can be enforced. For example, if it is a "one time" promotion, no discount should be offered next time. In another aspect, there might be a graduated promotion where the consumer obtains an additional reward for each occurrence, or only gets a reward after multiple occurrences. In essence, since the rules in registry 310 can be multi-transactional, this confirmation step, although optional, is preferred.

Given the discussion thus far, it will be appreciated that one or more embodiments of the invention may provide one or more advantages. For example, at least some embodiments reduce or eliminate the viral distribution of promotion codes, allowing retailers to selectively target specific sets of consumers when providing business incentives. Accordingly, retailers can define the audience of a promotion, in turn permitting rich incentives to be offered and allowing for differentiation of offers for different sub-audiences. Another exemplary advantage is the enhanced measurability of program effectiveness, wherein retailers can determine how consumers receive the codes that they use, in turn allowing evaluation of the effectiveness of different communication channels and messaging, as well as who is responding to promotional offers relative to the intended population and how those promotions drive intended purchase behavior or brand loyalty. Yet another exemplary advantage is the elimination of the need for the consumer to save, record, or otherwise remember the code until manually entered into the promotion code entry field on the merchant checkout page, recalling that promotion codes typically reach consumers through a variety of channels, including printed materials, advertisements, e-mail, and on-line communications.

Still another exemplary advantage is the opportunity for real-time (i.e., together with the transaction) promotion processing, with the accompanying positive emotional impact to the consumer, as well as the ability to make adjustments to the basket at the time of the transaction (e.g., free shipping, bonus gift in basket, etc.). An even further exemplary advantage includes the ability to determine offer eligibility based on factors besides transaction details processed in payment card clearing. For example, such transaction details processed in payment card clearing might include the total ticket amount, date, merchant location and card account. However, one or more embodiments of the invention enable determination of offer eligibility on additional factors such as processing of SKU-based promotions.

Furthermore, merchants will likely give more and better discounts or other promotions if they know who will be using them.

For the avoidance of doubt, while in one or more embodiments, blocks 310, 312, 308, 306 are provided by the PNO 2008, the promotion application process described does not take place during the conventional card authorization, clearing and settlement, but rather prior thereto; i.e., the promotion code is not furnished in the authorization request response but prior thereto. In one or more embodiments, the interaction with service 308 and platform 306 is, in essence, a pre-authorization approach. Consumer 2002 goes to merchant's web site, goes to the virtual shopping cart, clicks "pay by e-wallet" and is then presented with an authentication (username and password) and subsequently specifies that he or she wants to pay with "Card X." Platform 306 gives the merchant a pseudo-card number which PNO 2008 and platform 306 "know" is just a proxy for "Card X." Then the merchant is able to use the proxy number as a card number which the merchant then submits for authorization. In one or more embodiments, it is during the just-described interaction where the consumer is authenticating with the e-wallet 306 and then being rerouted back to the merchant, before anything has been passed off for authorization to the issuing bank, that the promotion code or other useful token is being passed on to the merchant.

One or more embodiments of the invention rely on the merchant to make an adjustment to the basket (virtual shopping cart) or to provide some other benefit in accordance with the promotion code or other useful token. In one or more embodiments, the merchant passes the transaction back to e-wallet platform 306, which then (in conjunction with service 308) determines whether the promotion may in fact be applicable, and if so, provides the merchant the required information.

Again, for the avoidance of doubt, in one or more embodiments of the invention, the consumer 2002 never "sees" the promotion code or other token, inasmuch as the consumer's eligibility for the promotion or the like is determined through the interaction with the e-wallet account and service 308 (this feature also helps to prevent unauthorized and/or undesired sharing of promotion codes outside a targeted group). Furthermore, while it would be possible to do so, in one or more embodiments of the invention, it is not necessary to restrict how many offers a particular code is entitled to, since the consumer never sees the code and only authorized consumers can obtain the benefit of the code.

One or more exemplary embodiments have been described in the context of an on-line transaction. However, at least some techniques disclosed herein can be adapted to other environments, such as the brick & mortar retail environment or the like. For example, in the retail environment, a useful token such as a promotion code (and/or data indicative thereof) could be conveyed to and/or from the merchant and/or consumer via near-field communication (NFC) and/or short message service (SMS).

System and Article of Manufacture Details

Embodiments of the invention can employ hardware and/or hardware and software aspects. Software includes but is not limited to firmware, resident software, microcode, etc. Software might be employed, for example, in connection with one or more of a terminal 122, 124, 125, 126; a reader 132; payment devices such as cards 102, 112; a host, server, and/or processing center 140, 142, 144 (optionally with data warehouse 154) of a merchant, issuer, acquirer, processor, or operator of a network 2008 operating according to a payment system standard (and/or specification), as well as blocks 304-308 of FIG. 3. Firmware might be employed, for example, in connection with payment devices such as cards 102, 112 and reader 132. Firmware provides a number of basic functions (e.g., display, print, accept keystrokes) that in themselves do not provide the final end-use application, but rather are building blocks; software links the building blocks together to deliver a usable solution.

Figure 7:
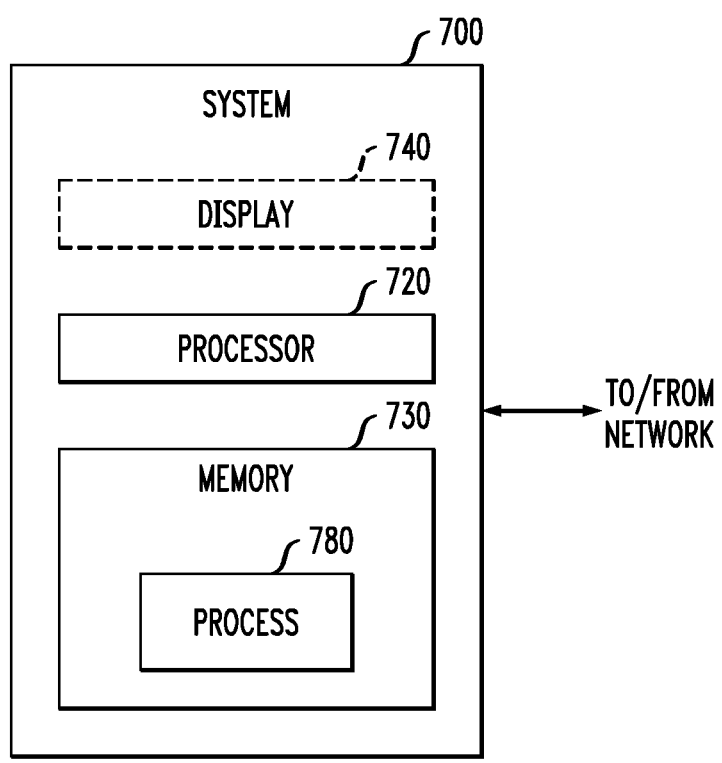
FIG. 7 is a block diagram of an exemplary computer system useful in one or more embodiments of the present invention.

FIG. 7 is a block diagram of a system 700 that can implement part or all of one or more aspects or processes of the invention. As shown in FIG. 7, memory 730 configures the processor 720 (which could correspond, e.g., to processor portions 106, 116, 130; processors of remote hosts in centers 140, 142, 144; processors of servers implementing blocks 304-312, and the like) to implement one or more aspects of the methods, steps, and functions disclosed herein (collectively, shown as process 780 in FIG. 7). Different method steps can be performed by different processors. The memory 730 could be distributed or local and the processor 720 could be distributed or singular. The memory 730 could be implemented as an electrical, magnetic or optical memory, or any combination of these or other types of storage devices (including memory portions as described above with respect to cards 102, 112). It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC rather than using firmware. Display 740 is representative of a variety of possible input/output devices (e.g., displays, mice, keyboards, and the like).

The notation "to/from network" is indicative of a variety of possible network interface devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium, examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 140, 142, 144, 304-312, 2004, 2006, 2008, 2010, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 140, 142, 144, 304-312, 2004, 2006, 2008, 2010 can make use of computer technology with appropriate instructions to implement method steps described herein. The various platforms can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 700 as shown in FIG. 7) running a server program. It will be understood that such a physical server may or may not include a display, keyboard, or other input/output components. A "host" includes a physical data processing system (for example, system 700 as shown in FIG. 7) running an appropriate program. It will be understood that such a host may or may not include a display, keyboard, or other input/output components.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. In one or more embodiments, the modules include a merchant checkout page module (for example, running on one or more hardware processors of a merchant server); an e-wallet platform module; a transaction qualification service module; an offers registry database module (for example, part of a rewards platform); and a consumer enrollment database module. The e-wallet platform module, transaction qualification service module, offers registry database module, and consumer enrollment database module can run, for example on one or more hardware processors of one or more PNO servers; in general, all could run on the same server, each could run on a separate server, blocks 308-312 could be on one server and block 306 could be on another server, and so on. Block 312, in some instances, could run on one or more database servers. In a preferred but non-limiting approach, elements 310 and 306 include software platforms while element 308 includes a software module providing connectivity and communication between platforms 306, 310. element 310 may include, for example, a rewards platform. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Computers discussed herein can be interconnected, for example, by one or more of network 138, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, and the like (an exemplary and non-limiting list), and can also make use of, for example, Extensible Markup Language (XML), known application programs such as relational database applications, spreadsheets, and the like. The computers can be programmed to implement the logic depicted in the flow charts and other figures.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:

obtaining, by an operator of a payment card network of a kind wherein said operator comprises a single operator which facilitates transactions between multiple issuers and multiple acquirers, using an electronic wallet platform, from a check-out web page of a merchant:

an indication that a given consumer, of a plurality of consumers, who is purchasing at least one item from said merchant in an on-line transaction, wishes to utilize said electronic wallet platform to pay for said on-line transaction, a unique identification of said given consumer, and associated transaction data;

wherein said electronic wallet platform comprises an electronic wallet platform module executing on a server of said payment card network operator, said electronic wallet platform storing information for a plurality of payment card accounts from which said given consumer can choose to pay for said on-line transaction;

supplying, by said operator of said payment card network using said electronic wallet platform, to a transaction qualification service, said unique identification of said given consumer;

retrieving, by said operator of said payment card network using said transaction qualification service, from a consumer enrollment database, a record wherein at least one promotion code is stored in association with said unique identification of said given consumer;

determining, by said operator of said payment card network using said transaction qualification service, based on rules from an offers registry database, whether said at least one promotion code is applicable to said on-line transaction, said rules being stored in said offers registry database in association with said at least one promotion code, said rules taking into account at least one of said unique identification of said given consumer and said associated transaction data in determining said applicability; and if, based on said determining step, said at least one promotion code is applicable to said on-line transaction, providing said at least promotion code to said merchant, by said operator of said payment card network using said transaction qualification service and said electronic wallet platform, said at least one promotion code being provided to said merchant prior to payment card authorization, clearing, and settlement for said on-line transaction, said at least one promotion code comprising an alphanumeric character sequence that is not visible to said given consumer.

2. The method of claim 1, further comprising the additional steps of:

subsequent to receiving said promotion code, said merchant revising a monetary amount associated with said on-line transaction, in accordance with said promotion code; and subsequent to said merchant revising said monetary amount associated with said on-line transaction, said merchant initiating said payment card authorization, clearing, and settlement for said on-line transaction, based on said revised monetary amount.

3. The method of claim 1, wherein, in said determining step, said rules take into account said associated transaction data, said associated transaction data comprising an identifying indicia of said at least one item.

4. The method of claim 1, wherein, in said determining step, said rules take into account said unique identification of said given consumer, by accessing said given consumer's transaction history based on said unique identification of said given consumer.

5. The method of claim 1, further comprising said merchant reporting an outcome of said on-line transaction to at least one of said electronic wallet platform and said transaction qualification service.

6. The method of claim 1, further comprising prompting said given consumer to select said electronic wallet platform from said check-out web page, wherein said indication that said given consumer wishes to utilize said electronic wallet platform is obtained in response to said prompting.

7. The method of claim 1, further comprising said operator of said payment card network targeting said plurality of consumers in connection with an offer associated with said promotion code.

8. The method of claim 1, further comprising populating said offers registry database.

9. The method of claim 1, further comprising automatically enrolling said plurality of consumers in said consumer enrollment database.

10. The method of claim 1, further comprising:

distributing an offer associated with said promotion code to at least said plurality of consumers; and accepting enrollment of said plurality of consumers, in said consumer enrollment database, in response to said offer.

11. The method of claim 1, further comprising the additional steps of:

populating said offers registry database;

said operator of said payment card network targeting said plurality of consumers in connection with an offer associated with said promotion code;

enrolling said plurality of consumers in said consumer enrollment database;

prompting said given consumer to select said electronic wallet platform from said check-out web page, wherein said indication that said given consumer wishes to utilize said electronic wallet platform is obtained in response to said prompting;

subsequent to receiving said promotion code, said merchant revising a monetary amount associated with said on-line transaction;

subsequent to said merchant revising said monetary amount associated with said on-line transaction, said merchant initiating said payment card authorization, clearing, and settlement for said on-line transaction, based on said revised monetary amount; and said merchant reporting an outcome of said on-line transaction to at least one of said electronic wallet platform and said transaction qualification service.

12. The method of claim 1, further comprising providing a system, wherein said system comprises distinct software modules, each of said distinct software modules being embodied on at least one non-transitory tangible computer readable recordable storage medium, and wherein said distinct software modules comprise an electronic wallet platform module, a transaction qualification service module, a consumer enrollment database module, and an offers registry database module;

wherein:

said obtaining and said supplying are carried out by said electronic wallet platform module executing on at least a first hardware processor;

said retrieving is carried out by said transaction qualification service module, executing on said at least first hardware processor, interacting with said consumer enrollment database module executing on said at least first hardware processor;

said determining is carried out by said transaction qualification service module, executing on said at least first hardware processor, interacting with said offers registry database module executing on said at least first hardware processor; and said providing is carried out by said transaction qualification service module and said electronic wallet platform module executing on said at least first hardware processor.

13. An apparatus comprising:

means for obtaining, by an operator of a payment card network of a kind wherein said operator comprises a single operator which facilitates transactions between multiple issuers and multiple acquirers, using an electronic wallet platform, from a check-out web page of a merchant:

an indication that a given consumer, of a plurality of consumers, who is purchasing at least one item from said merchant in an on-line transaction, wishes to utilize said electronic wallet platform to pay for said on-line transaction, a unique identification of said given consumer, and associated transaction data;

wherein said electronic wallet platform comprises an electronic wallet platform module executing on a server of said payment card network operator, said electronic wallet platform storing information for a plurality of payment card accounts from which said given consumer can choose to pay for said on-line transaction;

means for supplying, by said operator of said payment card network using said electronic wallet platform, to a transaction qualification service, said unique identification of said given consumer;

means for retrieving, by said operator of said payment card network using said transaction qualification service, from a consumer enrollment database, a record wherein at least one useful token promotion code is stored in association with said unique identification of said given consumer;

means for determining, by said operator of said payment card network using said transaction qualification service, based on rules from an offers registry database, whether said at least one promotion code is applicable to said on-line transaction, said rules being stored in said offers registry database in association with said at least one promotion code, said rules taking into account at least one of said unique identification of said given consumer and said associated transaction data in determining said applicability; and means for, if, based on said determining step, said at least promotion code is applicable to said on-line transaction, providing said at least one promotion code to said merchant, by said operator of said payment card network using said transaction qualification service and said electronic wallet platform, said at least one promotion code being provided to said merchant prior to payment card authorization, clearing, and settlement for said on-line transaction, said at least one promotion code comprising an alphanumeric character sequence that is not visible to said given consumer;

wherein said apparatus excludes a transmission medium and disembodied signal.

14. A computer program product comprising at least one non-transitory tangible computer readable recordable storage medium including computer usable program code, said computer program product including:

computer usable program code for obtaining, by an operator of a payment card network of a kind wherein said operator comprises a single operator which facilitates transactions between multiple issuers and multiple acquirers, using an electronic wallet platform, from a check-out web page of a merchant:

an indication that a given consumer, of a plurality of consumers, who is purchasing at least one item from said merchant in an on-line transaction, wishes to utilize said electronic wallet platform to pay for said on-line transaction, a unique identification of said given consumer, and associated transaction data;

wherein said electronic wallet platform comprises an electronic wallet platform module executing on a server of said payment card network operator, said electronic wallet platform storing information for a plurality of payment card accounts from which said given consumer can choose to pay for said on-line transaction;

computer usable program code for supplying, by said operator of said payment card network using said electronic wallet platform, to a transaction qualification service, said unique identification of said given consumer;

computer usable program code for retrieving, by said operator of said payment card network using said transaction qualification service, from a consumer enrollment database, a record wherein at least one promotion code is stored in association with said unique identification of said given consumer;

computer usable program code for determining, by said operator of said payment card network using said transaction qualification service, based on rules from an offers registry database, whether said at least one promotion code is applicable to said on-line transaction, said rules being stored in said offers registry database in association with said at least one promotion code, said rules taking into account at least one of said unique identification of said given consumer and said associated transaction data in determining said applicability; and computer usable program code for, if, based on said determining step, said at least one promotion code is applicable to said on-line transaction, providing said at least one promotion code to said merchant, using said transaction qualification service and said electronic wallet platform, said at least one promotion code being provided to said merchant prior to payment card authorization, clearing, and settlement for said on-line transaction, said at least one promotion code comprising an alphanumeric character sequence that is not visible to said given consumer.

15. A system comprising:

at least one hardware processor; and a memory coupled to said at least one hardware processor, said memory including instructions which when executed by said at least one processor cause said at least one processor to implement an electronic wallet platform, a transaction qualification service, a consumer enrollment database, and an offers registry database;

said electronic wallet platform being operated by an operator of a payment card network and configured to obtain, from a check-out web page of a merchant:

an indication that a given consumer, of a plurality of consumers, who is purchasing at least one item from said merchant in an on-line transaction, wishes to utilize said electronic wallet platform to pay for said on-line transaction, a unique identification of said given consumer, and associated transaction data;

wherein said payment card network is of a kind wherein said operator comprises a single operator which facilitates transactions between multiple issuers and multiple acquirers, said electronic wallet platform storing information for a plurality of payment card accounts from which said given consumer can choose to pay for said on-line transaction;

said transaction qualification service being operated by said operator of said payment card network and in data communication with said electronic wallet platform, said electronic wallet platform being further configured to supply, to said transaction qualification service, said unique identification of said given consumer;

said consumer enrollment database being operated by said operator of said payment card network and in data communication with said transaction qualification service, said transaction qualification service being further configured to retrieve, from said consumer enrollment database, a record wherein at least one promotion code is stored in association with said unique identification of said given consumer; and said offers registry database being operated by said operator of said payment card network and in data communication with said transaction qualification service, said transaction qualification service being further configured to determine, based on rules from said offers registry database, whether said at least one promotion code is applicable to said on-line transaction, said rules being stored in said offers registry database in association with said at least one promotion code, said rules taking into account at least one of said unique identification of said given consumer and said associated transaction data in determining said applicability;
said transaction qualification service and said electronic wallet platform being further configured to provide said at least one promotion code to said merchant, if, based on said determining, said at least one promotion code is applicable to said on-line transaction, said at least one promotion code being provided to said merchant prior to payment card authorization, clearing, and settlement for said on-line transaction, said at least one promotion code comprising an alphanumeric character sequence that is not visible to said given consumer.

16. The system of claim 15, wherein, in said determining by said transaction qualification service, said rules from said offers registry database take into account said associated transaction data, said associated transaction data comprising an identifying indicia of said at least one item.

17. The system of claim 15, wherein, in said determining by said transaction qualification service, said rules from said offers registry database take into account said unique identification of said given consumer, by said transaction qualification service accessing said given consumer's transaction history based on said unique identification of said given consumer.

18. The system of claim 15, wherein at least one of said electronic wallet platform and said transaction qualification service is further configured to receive from said merchant a report of an outcome of said on-line transaction.

19. A system comprising:
an electronic wallet platform operated by an operator of a payment card network and configured to obtain, from a check-out web page of a merchant:
an indication that a given consumer, of a plurality of consumers, who is purchasing at least one item from said merchant in an on-line transaction, wishes to utilize said electronic wallet platform to pay for said on-line transaction,
a unique identification of said given consumer, and associated transaction data;
wherein said electronic wallet platform comprises an electronic wallet platform software module executing on a server of said payment card network operator and wherein said payment card network is of a kind wherein said operator comprises a single operator which facilitates transactions between multiple issuers and multiple acquirers, said electronic wallet platform storing information for a plurality of payment card accounts from which said given consumer can choose to pay for said on-line transaction;
a transaction qualification service operated by said operator of said payment card network and in data communication with said electronic wallet platform, said electronic wallet platform being further configured to supply, to said transaction qualification service, said unique identification of said given consumer;
a consumer enrollment database operated by said operator of said payment card network and in data communication with said transaction qualification service, said transaction qualification service being further configured to retrieve, from said consumer enrollment database, a record wherein at least one promotion code is stored in association with said unique identification of said given consumer; and
an offers registry database operated by said operator of said payment card network and in data communication with said transaction qualification service, said transaction qualification service being further configured to determine, based on rules from said offers registry database, whether said at least one promotion code is applicable to said on-line transaction, said rules being stored in said offers registry database in association with said at least one promotion code, said rules taking into account at least one of said unique identification of said given consumer and said associated transaction data in determining said applicability;
said transaction qualification service and said electronic wallet platform being further configured to provide said at least one promotion code to said merchant, if, based on said determining, said at least one promotion code is applicable to said on-line transaction, said at least one promotion code being provided to said merchant prior to payment card authorization, clearing, and settlement for said on-line transaction, said at least one promotion code comprising an alphanumeric character sequence that is not visible to said given consumer;
wherein:
said electronic wallet platform software module is embodied on an electronic wallet platform non-transitory tangible, computer-readable, recordable storage medium;
said electronic wallet platform comprises:
an electronic wallet platform memory;
said electronic wallet platform software module; and
at least one electronic wallet platform hardware processor of said server of said payment card network operator, operative to execute said electronic wallet platform software module when loaded into said electronic wallet platform memory;
said transaction qualification service comprises:
a transaction qualification service memory;
a transaction qualification service software module embodied on a transaction qualification service non-transitory tangible, computer-readable, recordable storage medium; and
at least one transaction qualification service hardware processor, operative to execute said transaction qualification service software module when loaded into said transaction qualification service memory;
said consumer enrollment database comprises:
a consumer enrollment database memory;
a consumer enrollment database platform software module embodied on a consumer enrollment database non-transitory tangible, computer-readable, recordable storage medium; and
at least one consumer enrollment database hardware processor, operative to execute said consumer enrollment database platform software module when loaded into said consumer enrollment database memory; and
said offers registry database comprises:
an offers registry database memory;
an offers registry database platform software module embodied on an offers registry database non-transitory tangible, computer-readable, recordable storage medium; and
at least one offers registry database hardware processor, operative to execute said offers registry database platform software module when loaded into said offers registry database memory.

* * * * *